United States Patent [19]

Boblitt

[11] Patent Number: 4,710,076
[45] Date of Patent: Dec. 1, 1987

[54] METHOD FOR CUTTING COMPLEX TOOTH PROFILES IN A CYLINDRICAL, SINGLE-SCREW GATE-ROTOR

[75] Inventor: Wayne W. Boblitt, Glen Burnie, Md.

[73] Assignee: The United States of America as represented by the Secretary of the Navy, Washington, D.C.

[21] Appl. No.: 775,981

[22] Filed: Sep. 13, 1985

[51] Int. Cl.$^4$ ............................................. B23F 9/10
[52] U.S. Cl. ...................................... 409/26; 51/52 R; 51/287; 29/156.8 R; 409/51; 409/57
[58] Field of Search ................... 409/52, 56, 57, 131, 409/25, 26, 51; 29/156.8 T, 156.8 R

[56] References Cited

U.S. PATENT DOCUMENTS

| | | | |
|---|---|---|---|
| 1,950,419 | 3/1934 | Sinderson | 409/56 |
| 2,257,850 | 10/1941 | Miller | 51/123 |
| 2,388,173 | 10/1945 | Miller | 51/123 |
| 2,659,277 | 11/1953 | Miller | 409/56 X |
| 3,932,077 | 1/1976 | Zimmern | 418/195 |
| 4,034,645 | 7/1977 | Keijer | 90/4 |
| 4,222,691 | 9/1980 | Zimmern | 409/26 |
| 4,321,022 | 3/1982 | Zimmern | 418/195 |

FOREIGN PATENT DOCUMENTS 775716 5/1957 United Kingdom .................. 409/52

*Primary Examiner*—John Sipos
*Attorney, Agent, or Firm*—Luther A. Marsh

[57] ABSTRACT

A method for manufacturing precision gate-rotors and gate-rotor supports for a single-screw mechanism by cutting the complex tooth profiles in a cylindrical gate-rotor blank. The cylindrical blank is rotated about its center axis as a cutting tool is translated in a fixed two-axis plane, one axis being the centerline of the cylindrical blank and the second axis being a line extending radially therefrom. This process may be carried out by a multi-axis, numerically controlled milling machine.

4 Claims, 10 Drawing Figures

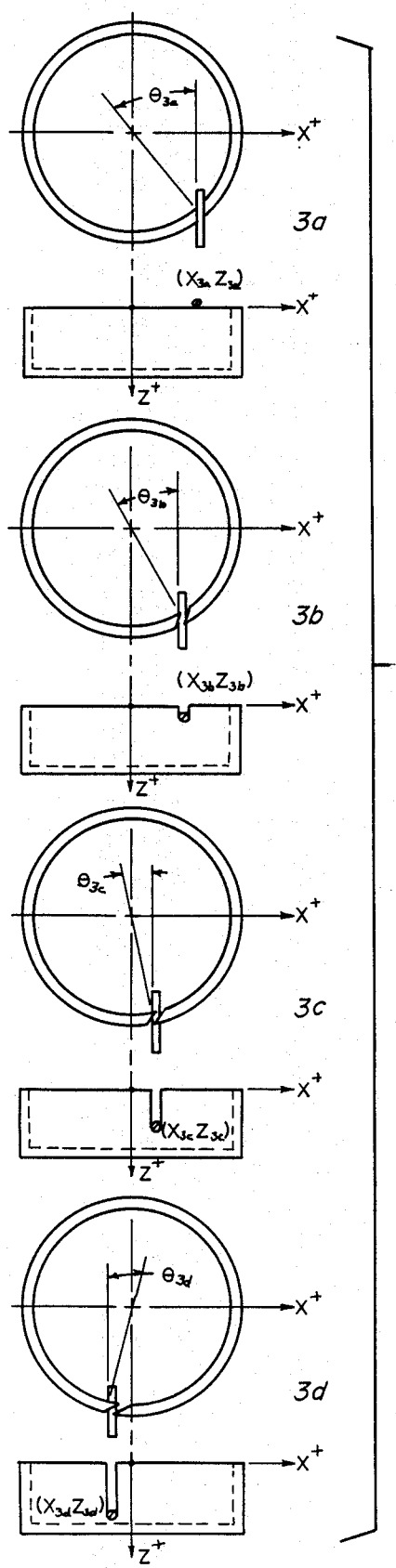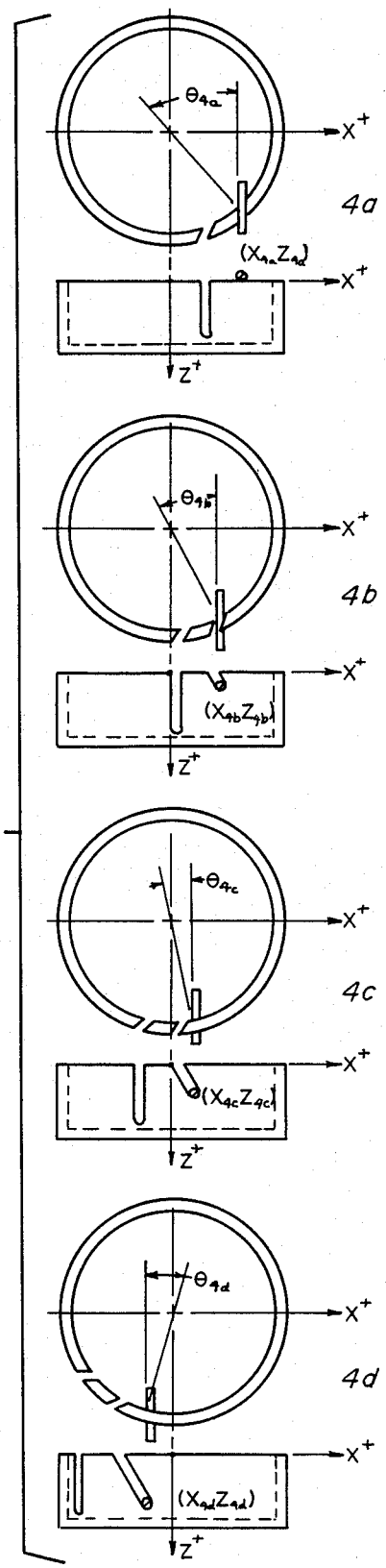
FIG. 3
FIG. 4

METHOD FOR CUTTING COMPLEX TOOTH PROFILES IN A CYLINDRICAL, SINGLE-SCREW GATE-ROTOR

BACKGROUND OF THE INVENTION

1. Field of the Invention

The present invention relates generally to a method for manufacturing a gate-rotor and gate-rotor support, and more specifically to a method for cutting precision tooth profiles in a cylindrical gate-rotor or gate-rotor support blank with a multi-axis numerically controlled milling machine.

2. Description of the Prior Art

Recent developments in shipboard operation systems require an efficient high pressure compressor. A device having a constant compressed air flow at about 3,000 psi is desired. One device generally suitable for shipboard operations is a positive displacement type machine known as a single screw mechanism. The single-screw mechanism can be made to operate as a compressor, an expansion machine, a pump, a hydraulic motor, or the like.

The primary components of a single screw mechanism are a mainrotor, a gate-rotor with a gate-rotor support, and a mainrotor housing. The mainrotor, provided with at least one thread, is driven and spins about its center axis. The gate-rotor is generally cylindrical, having at least one gear tooth which meshes with the mainrotor threads and is thereby driven by the mainrotor. The gate-rotor is generally backed by a metal gate-rotor support which follows and supports each gate-rotor tooth in the mainrotor thread. The mainrotor housing is fitted in close proximity to the crests of the mainrotor and is provided with at least one port leading to a suction plenum, and at least one additional part leading to a discharge plenum.

The general operation of a single screw gas compressor is as follows: Gas is drawn into the mainrotor thread from the suction plenum; When the thread is filled with gas, a gate-rotor tooth rotates into position and, in cooperation with the mainrotor housing, closes off the thread to form a compression chamber; As the mainrotor turns, the gate-rotor tooth proceeds through the thread, reduces the compression chamber volume, and thereby compresses the gas; When the desired gas pressure is achieved, the edge of the rotating mainrotor thread uncovers a discharge port in the mainrotor housing and the compressed gas is expelled into the discharge plenum.

High pressure compressors require a precision cut gate-rotor. An accurate mesh between the mainrotor thread and the gate-rotor tooth is a critical requirement for an efficient high pressure compressor. The gate-rotor tooth must accurately mesh with the thread because it forms one constraining boundary of the compression chamber. If the gate-rotor tooth profile does not accurately mesh with the mainrotor thread, the gas leaks from the compression chamber, and the volumetric efficiency of the compressor is reduced. An inaccurate mesh also causes friction and wear, reducing the mechanical efficiency of the compressor.

High pressure compressors also require a precision cut gate-rotor support. The gate-rotor support provides structural support to the gate-rotor teeth, reducing gate-rotor tooth deflection and damage. Gate-rotor tooth deflection and damage are caused by friction and compression chamber pressure forces. Friction and compression chamber forces will bend, twist, and/or break an inadequately supported gate-rotor tooth. The gate-rotor support tooth profile is not critical for low pressure applications, as it must simply fit behind a gate-rotor tooth and travel through the mainrotor thread without interfering. The gate-rotor support tooth profile is critical for high pressure applications, as it must also counteract both the greater frictional wear forces and the greater internal pressure forces. The high pressure devices presently being developed require the gate-rotor support to extend to its maximum width and thickness, becoming a metal extension of the gate-rotor. At these high pressures, slight inadequacies in tooth support increase deflection, structural fatigue, and damage, thereby reducing the efficiency of the compressor. These high pressure gate-rotor supports must therefore be manufactured with the same tooth profile accuracy as the gate-rotors they support.

The sealing surfaces of a gate-rotor tooth form complex shapes. The cylindrical gate-rotor tooth is generally trapezoidal, however the flanks of the tooth are formed by complex angles. The gate-rotor seals in a cylindrical plane, however each tooth has a finite thickness inside and outside of the sealing plane. Therefore each tooth flank must have relief angles to facilitate efficient travel through the mainrotor thread. The tooth flanks generally comprise at least two relief angles, or flank angles, which intersect to form the complex sealing lines of the tooth. Zimmern, in U.S. Pat. No. 4,321,022, discloses tooth profiles having at least three skewed surfaces (and the resultant 2 sealing lines) on each flank. Furthermore, each flank angle varies in size from the base to the apex of the tooth. This variation is necessary to achieve an accurate mesh with the mainrotor thread throughout the length of the compression chamber.

The U.S. Navy is presently developing a grinding method for manufacturing precision gate-rotors for high pressure compressors. Commercially available gate-rotor supports are manufactured by casting. As gate-rotor supports are generally composed of high strength metals, manufacturing gate-rotor supports by a grinding method would be inefficient. This is particularly true for the thick gate-rotor supports of a high pressure compressor.

Precision cut gate-rotors and gate-rotor supports are essential for the efficient high pressure compressor desired. For these and other reasons, a need exists for a method for accurately cutting the complex flank angles of these precision, high pressure gate-rotor and gate-rotor support tooth profiles.

SUMMARY OF THE INVENTION

It is therefore an object of the present invention to develop an efficient, compact, high pressure compressor.

It is another object of the present invention to reduce friction and wear in a high pressure single-screw compressor.

It is another object of the present invention to reduce compression leakage in a high pressure single screw compressor.

It is another object of the present invention to reduce gate-rotor tooth deflection in a high pressure single screw compressor.

It is another object of the present invention to develop a manufacturing method for cutting the complex flank angles of precision, high pressure, single screw compressor gate-rotors and gate-rotor supports.

These objects and further advantages are achieved by the present invention, a method for manufacturing a precision gate-rotor and gate-rotor support by cutting complex tooth profiles in a cylindrical blank, comprising the steps of: rotating a cylindrical blank about its center axis, engaging the rotating cylindrical blank with a cutting element, and translating the cutting element in a fixed two-axis plane, one axis being the centerline of the cylindrical blank, the second axis extending radially therefrom, and the cutting element being normal to the two-axis plane.

BRIEF DESCRIPTION OF THE DRAWINGS

A more complete appreciation of the invention will become apparent from the following detailed description when considered in conjunction with the accompanying drawings, wherein:

FIG. 3 illustrates a first pass of the cutting tool, the translation path defining one flank angle of the straight edge of a trapezoidal tooth.

FIG. 4 illustrates a second pass of the cutting tool, the translation path defining one flank angle of the helix edge of a trapezoidal tooth.

DETAILED DESCRIPTION OF THE PREFERRED EMBODIMENT

Figure 1B:
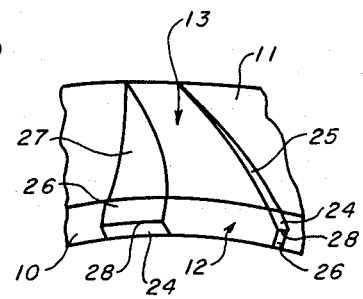
FIGS. 1a and 1b illustrates a cylindrical gate-rotor and gate-rotor support for a single screw mechanism.
Figure 1A:
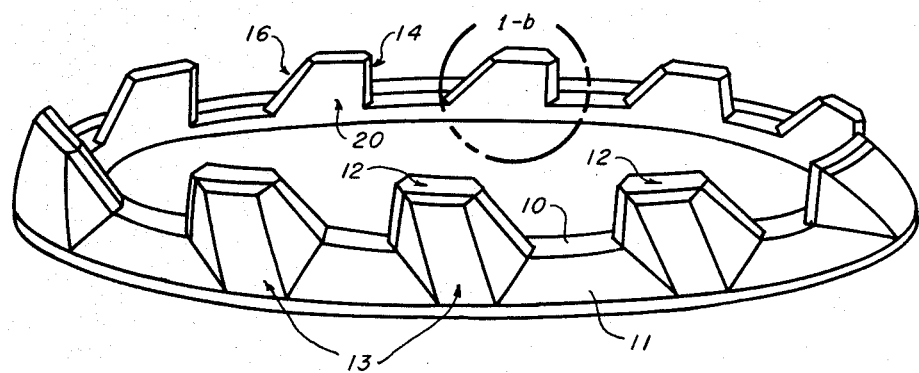

Referring now to the drawings, and specifically to FIG. 1, there is generally illustrated a cylindrical gate-rotor 10 and gate-rotor support 11 for a single screw mechanism. The gate-rotor 10 comprises a series of teeth 12, each having the same tooth profile. The gate-rotor support 11 comprises a corresponding series of support teeth 13, each having the same support tooth profile.

One face of each gate-rotor tooth 12 forms one boundary of the compression chamber in a single screw compressor (not shown). This compression face may be either the radially interior face or the radially exterior face, dependent on the positioning of the gate-rotor 10 relative to the mainrotor (not shown). If the compression face is the interior face, the gate-rotor support 11 is disposed on the exterior of the gate-rotor. If the compression face is the exterior face, then the gate-rotor support 11 is disposed on the interior of the gate-rotor.

In FIG. 1, and in the following figures and detailed description, the compression face is defined by the interior face 20, however, it will be clear to those skilled in the art that the manufacturing process is equally applicable to devises having the compression face defined by the exterior face of the gate-rotor.

The gate-rotor teeth profiles form complex shapes. In FIG. 1, each gate-rotor tooth 12 is shown to be generally trapezoidal in shape, having a straight edge 14 and a helix edge 16. Generally, each edge of a gate-rotor tooth profile is comprised of at least two flank angles, and each gate-rotor support tooth profile is comprised of at least one flank angle.

FIG. 1b, an enlarged top view of a tooth, more clearly illustrates the complex shape of the gate-rotor and gate-rotor support tooth profile. Each gate-rotor tooth 12 of FIG. 1b is comprised of two flank angles 24,26 which intersect to form the sealing line 28. Flank angle 24 is defined as the minimum flank angle. Flank angle 26 is defined as the maximum flank angle. These angles are defined relative to a radial line of the cylindrical gate-rotor. These angles are critical, as it is the sealing line 28 which contacts the wall of the mainrotor thread (not shown) to seal off the compression chamber in a single screw mechanism.

The gate-rotor support tooth profiles are also complex shapes. Each gate-rotor support tooth 13 forms an extension of its corresponding gate-rotor tooth 12. The flank angles 25,27 maintain a continuous support structure, capable of accurately meshing with the mainrotor threads.

Figure 2:
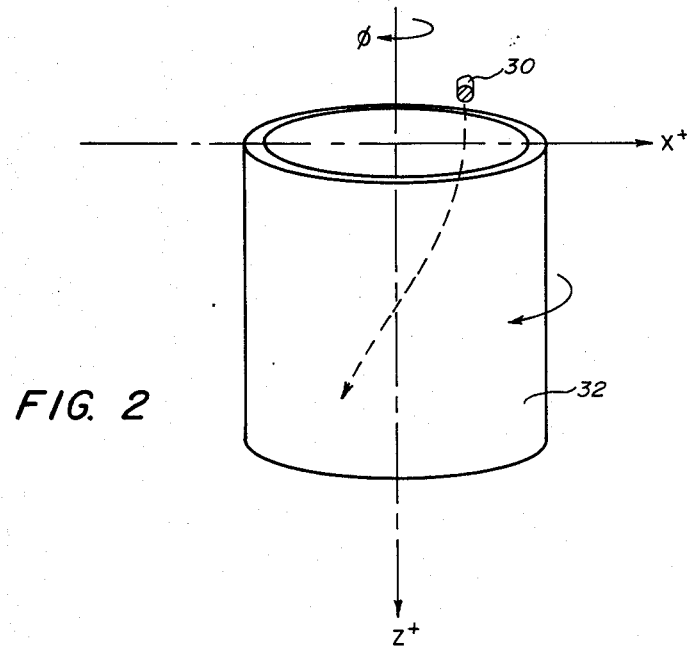
FIG. 2 schematically illustrates a translation path of a cutting tool relative to a cylindrical gate-rotor blank in the manufacturing method of the present invention.

Referring now to FIG. 2, the cutting method of the present invention is schematically illustrated. Each flank angle of a tooth profile is formed by a single pass of the cutting element 30. Generally, the cutting element 30 is translated in a fixed X-Z plane while the cylindrical blank 32 is rotated about its center axis. This continuous cut is essential for a precision mesh between a gate-rotor tooth and the mainrotor thread.

The method of the present invention may be used to manufacture a gate-rotor or a gate-rotor support from a cylindrical blank. Furthermore, as the gate-rotor support of a high pressure compressor is an extension of the gate-rotor, the corresponding tooth profiles having the same flank angles, the gate-rotor and gate-rotor support may be machined simultaneously.

FIG. 3 illustrates the cutting of one flank angle of the straight side of a gate-rotor tooth using the method of the present invention. FIG. 3a shows the cutting element 30 engaging the cylindrical blank 32. The cutting element 30 is positioned at point $X_{3a}Z_{3a}$, at an angle of $\theta_{3a}$ with the radial line of the cylindrical blank 32, and normal to the X-Z plane. FIG. 3b shows the cutting element 30 later in the cut, having translated to position $X_{3b}Z_{3b}$, at an angle of $\theta_{3b}$ with the radial line of the cylindrical bank 32. The cylindrical blank 32 has rotated with the cutting element 30 translation such that the center line of the cut forms a straight line in the direction of the length of the cylindrical blank 32. FIG. 3c shows the cutting element 30 still later in the cut, having translated to position $X_{3c}Z_{3c}$, at an angle of $\theta_{3c}$ with the radial line of the cylindrical blank 32. FIG. 3d shows the cutting element 30 at the end of the first straight side pass. The cutting element 30 is positioned at $X_{3d}Z_{3d}$, at an angle of $\theta_{3d}$ with the radial line of the cylindrical blank 32. The cutting element has remained normal to the X-Z plane throughout the translation. The centerline of the cut is a straight line along the length of the cylindrical blank 32. The angle of the cut with respect to the radial line, $\theta$, defines one flank angle of the straight side of a tooth profile. The flank angle $\theta$ varies continuously along the finished cut from the angle of $\theta_{3a}$ to the angle of $\theta_{3d}$.

FIG. 4 illustrates the cutting of one flank angle of the helix side of a gate-rotor tooth using the method of the present invention. FIG. 4a shows the cutting element 30 engaging the cylindrical blank 32. The cutting element is positioned at point $X_{4a}Z_{4a}$, at an angle of $\theta_{4a}$ with the radial line of the cylindrical blank 32, and normal to the X-Z plane. FIG. 4b shows the cutting element 30 later in the cut, having translated to position $X_{4b}Z_{4b}$ at an angle of $\theta_{4b}$ with the radial line of the cylindrical blank 32. The cylindrical blank 32 has rotated with the cutting element 30 translation such that the center line of the cut forms a helix segment about the cylindrical blank 32. FIG. 4c shows the cutting element 30 still later in the cut, having translated to position $X_{4c}Z_{4c}$, at an angle of $\theta_{4c}$ with the radial line of the cylindrical blank 32. FIG. 4d shows the cutting element 30 at the end of the first helix side pass. The cutting element 30 is positioned at $X_{4d}Z_{4d}$, at an angle of $\theta_{4d}$ with the radial line of the cylindrical blank 32. The cutting element has remained normal to the X-Z plane throughout the translation. The centerline of the cut is a helix segment along the length of the cylindrical blank 32. The angle of the cut with respect to the radial line, $\theta$, defines one flank angle of the helix side of a tooth profile. The flank angle $\theta$ varies continuously along the finished cut from the angle of $\theta_{4a}$ to the angle of $\theta_{4d}$.

Figure 5A:
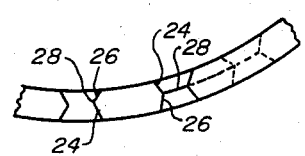
FIGS. 5a and 5b illustrate a tooth profile having two flank angles on each edge of the tooth profile.
Figure 5B:
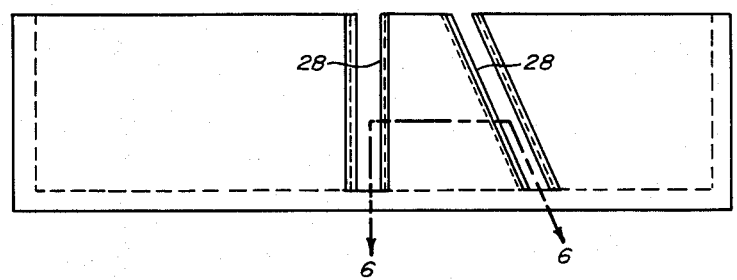

FIGS. 5a and 5b illustrate a gate-rotor tooth cut by the method of the present invention. Each side of the tooth profile (the straight side and the helix side) is defined by two flank angles, a maximum flank angle 26 and a minimum flank angle 24, which form a sealing line 28.

Figure 6:
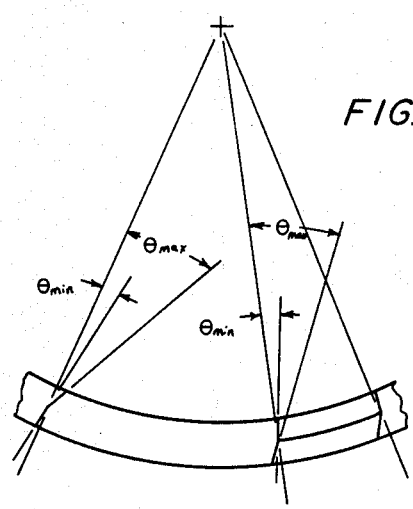
FIG. 6 is a cut away view of the tooth profile taken along line 6—6 of FIG. 5b.

FIG. 6 illustrates a cut-away view of the tooth profile along line 6—6 of FIG. 5b. The maximum flank angle of the straight side is equal to the maximum flank angle of the helix side. The minimum flank angle of the straight side is equal to the minimum flank angle of the helix side. This is true for each Z coordinate.

For both the straight side cut and the helix side cut, the position of the cutting element 30 on the X axis determines the flank angle of the tooth profile at that point. The combined cylindrical blank 32 rotation and cutting element 30 translation determine the complete tooth profile. It will be obvious to those skilled in the art that numerous variations of tooth profiles may be generated by controlling the relative motion between the cutting element 30 and the cylindrical blank 32.

Figure 7:
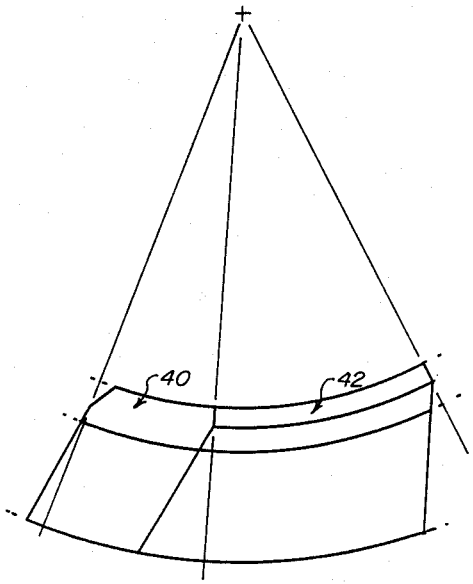
FIG. 7 illustrates the continuous flank profile of a gate-rotor and gate-rotor support tooth generated by the method of the present invention.

FIG. 7 illustrates the combination of a gate-rotor tooth cut by the method of the present invention, and a corresponding gate-rotor support tooth also cut by the method of the present invention. The tip of the tooth is designated as 40. The helix flank is designated as 42. The flank angles of the gate-rotor support tooth are cut to form a continuous extension of the gate-rotor tooth. The gate-rotor support tooth thereby gives maximum structural support to the gate-rotor tooth, with minimal efficiency loss due to friction and/or leakage.

In the preferred embodiment, the co-ordinates X, Z, and $\phi$ for cutting the gate-rotor of a desired mainrotor/gate-rotor device are determined by the mathematical analysis of the desired mainrotor/gate-rotor configuration. The cutting coordinates are then fed into the data base of a multi-axis, numerically controlled milling machine which coordinates and controls the relative gate-rotor blank rotation and cutting element translation.

Figure 8:
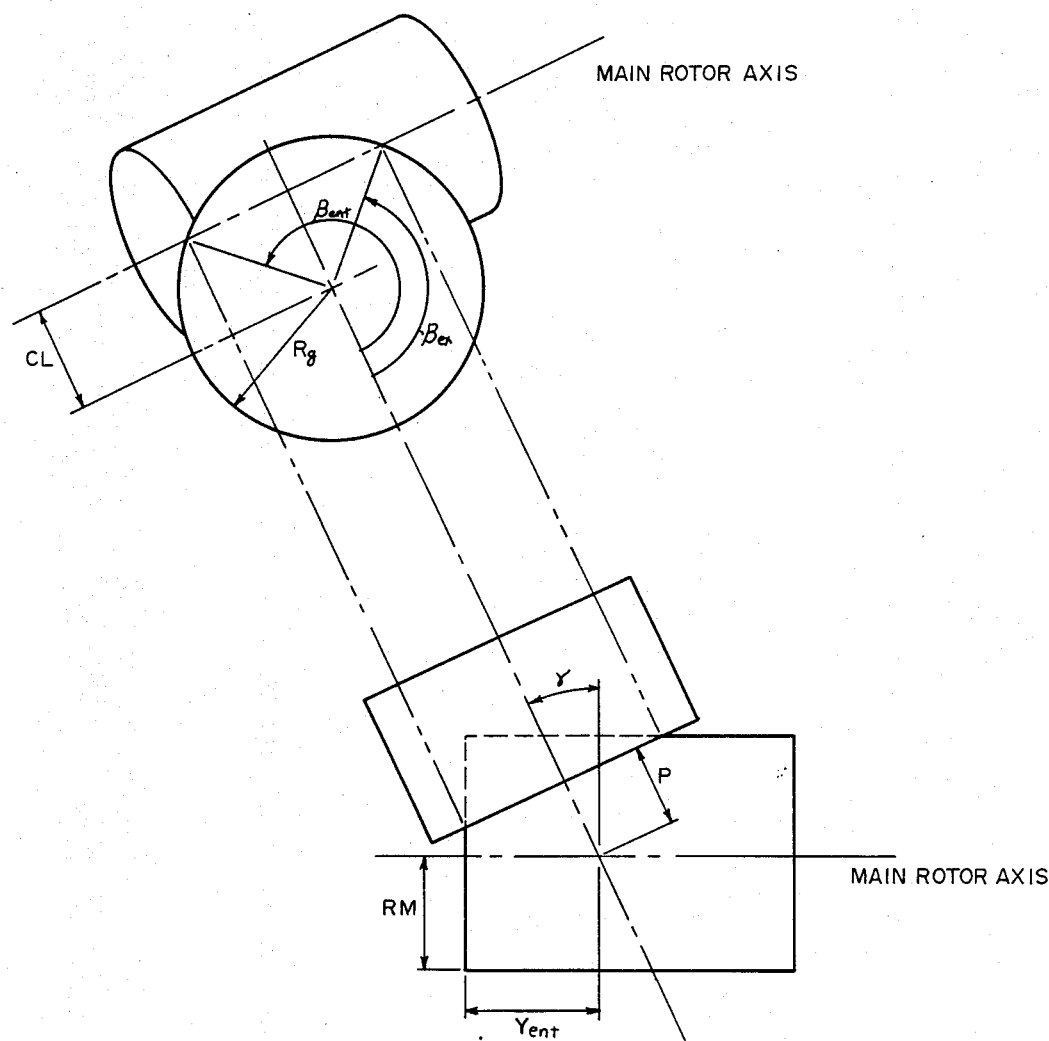
FIG. 8 schematically illustrates the relative positions of a mainrotor and gate-rotor in mesh, and defines the variables for generating the tooth profiles of the preferred embodiment.

FIG. 8 schematically illustrates the configuration of a mainrotor and a gate-rotor in mesh. The variables and constants are defined as follows:

NG = number of gate-rotor teeth
NM = number of mainrotor threads
Rg = the radius of the gate-rotor
Rm = the radius of the mainrotor
$\gamma$ = the angle of inclination between the mainrotor and gate-rotor
CL = distance between the mainrotor centerline and the gate-rotor centerlines (note that the centerlines cross but do not intersect.)
$\beta_{ent}$ = The angle at which a gate-rotor tooth enters a mainrotor thread as measured from the auxiliary view centerline
$\beta_{ex}$ = the angle at which a gate-rotor tooth exits a mainrotor thread as measured from the auxiliary view centerline
$Y_{ent}$ = the distance along the mainrotor centerline from the end of the mainrotor at which the gate-rotor tooth enters to the point at which the mainrotor and gate-rotor centerlines cross (but do not intersect)
P = the penetration variable, is the distance from the line of greatest penetration by the gate-rotor teeth to a parallel line passing through the point at which the mainrotor and gate-rotor centerlines cross (but do not intersect).

To find the X, Z, and $\phi$ data base values for cutting a generally trapazoidal tooth profile with a multi-axis numerically controlled milling machine, first, for each Z, solve Equations 1 & 2 for $\beta_{ent}$ and $\beta_{ex}$:

Eq. 1

$$Y_{ent} = Rg \sin(\beta_{ent}) \cos(\gamma) - P \sin(\gamma)$$

Eq. 2

$$Rm^2 = [CL + Rg \cos(\beta_{ex})]^2 + [Rg \sin(\beta_{ex}) \sin(\gamma) + (Z+P) \cos(\gamma)]^2$$

Then, for each Z, iterate between the values of $\beta_{ent}$ and $\beta_{ex}$ to find the extremes in Equation 3:

Eq. 3

$$\theta = \pi - \beta + \tan^{-1} \left[ \frac{\frac{NG}{NM}(CL + Rg \cos\beta \sin\gamma) + Rg \cos\beta}{\frac{NG}{NM}(Rg \sin\beta \sin\gamma + (Z+P)\cos\gamma) + Rg \sin\beta} \right]$$

The maximum value, $\theta_{max}$, gives the absolute angular position of the cutting element for each Z for generating the maximum flank angle of the straight side of a trapazoidal tooth profile. The minimum value, $\theta_{min}$, gives the absolute angular position of the cutting element for each Z for generating the minimum flank angle of straight side of a trapazoidal tooth profile. The position of the cutting element on the X-axis is then defined by Equation 4:

Eq. 4

$$X = Rg \sin \theta$$

The angular rotation of the blank, $\phi$, is given by Equation 5:

Eq. 5

$$\phi = \phi_{Ref\beta} - \theta$$

Generally, the initial choice of $\phi_{Ref3}$ for a particular tooth flank is arbitrary. Then, for each successive relief angle cut on that flank, $\theta_{Ref3}$ remains constant. In the preferred embodiment, $\theta_{Ref3}$ is the angle at which the cutting element engages the cylindrical blank when cutting the first relief angle.

The calculations for finding the X, Z, and $\phi$ data base values for cutting the helix side of generally trapazoidal tooth profile, having a helix constant of H, are substantially similar. First, for each Z, solve Equations 1 & 2 for $\beta_{ent}$ and $\beta_{ex}$. Then, for each Z, iterate between the values of $\beta_{ent}$ and $\beta_{ex}$ to find the extremes in Equation 3. The maximum value, $\theta_{max}$, gives the absolute angular position of the cutting element for each Z for generating the maximum flank angle of the helix side of the trapazoidal tooth profile. The minimum solution, $\theta_{min}$, gives the absolute angular position of the cutting element for each Z for generating the minimum flank angle of the helix side of the trapazoidal tooth profile. The position of the cutting element on the X-axis for each Z is then defined by Equation 4. The angular rotation of the blank, $\phi$, is given by Equation 6:

Eq. 6

$$\phi = \phi_{Ref4} - \theta + Z/H$$

where $\phi_{Ref4}$ is defined by Equation 7:

Eq. 7

$$\phi_{Ref4} = \phi_{Ref3} + 2\sin^{-1}(w/2Rg)$$

and where w = the cord length of the tip of the tooth.

Numerous modifications and variations of the present invention are possible in light of the above teachings. The coordinates X, Z, and $\phi$ may be determined otherwise than as herein disclosed. It is therefore to be understood that within the scope of the appended claims, the invention may be practices otherwise than as specifically described herein.

I claim:

1. A method for cutting a complex tooth profile in a cylindrical gate-rotor blank, comprising the steps of:
   rotating the cylindrical gate-rotor blank about its center axis;
   engaging the cylindrical gate-rotor blank with a cutting element having a longitudinal axis perpendicular to said center axis translating the cutting element along a non-circular path in a fixed two-axis plane while cutting the blank, that plane being parallel to the plane defined by the centerline of the cylindrical blank and a line extending radially therefrom, while keeping the cutting element normal to the two-axis plane throughout the cutting operation, said translating step including maintaining the cutter in said plane while moving the cutter simultaneously along lines parallel and perpendicular to said blank centerline to form said path and repeating the cutting operation to form a plurality of tooth profiles.

2. The method recited in claim 1, wherein the translation of the cutting element is controlled by a multi-axis, numerically controlled milling machine.

3. The method recited in claim 1, wherein the steps are repeated for each tooth flank, and
   flanking each tooth by a maximum and a minimum angle, said angles being such that upon intersecting they form a sealing line.

4. The method recited in claim 3, wherein the coordinates of the translation path of the cutting element for the straight edge of a generally trapazoidal gate-rotor tooth profile are defined by Equations 1 through 5, wherein, for each Z, X is determined by Equation 4, $\theta_{max}$ and $\theta_{min}$ are determined by solving equations 1 & 2 for $\beta_{ent}$ and $\beta_{ex}$ and iterating between the values of $\beta_{ent}$ and $\beta_{ex}$ in Equation 3, and $\phi$ is determined by Equation 5;

and wherein the coordinates of the translation path of the cutting element for the helix edge of a generally trapazoidal gate-rotor tooth profile, having a helix constant of H, are defined by Equations 1 through 4, 6, and 7, wherein for each Z, X is defined by Equation 4, $\theta_{max}$ and $\theta_{min}$ are determined by solving Equations 1 & 2 for $\beta_{ent}$ and $\beta_{ex}$ and iterating between the values of $\beta_{ent}$ and $\beta_{ex}$ in Equation 3, and $\phi$ is determined by Equation 6, where the constant $\phi_{Ref4}$ is given by Equation 7 wherein said Equations 1-7 are as follows:

Eq. 1

$$Y_{ent} = Rg \sin(\beta_{ent}) \cos(\gamma) - P \sin(\gamma)$$

Eq. 2

$$Rm^2 = [CL + Rg \cos(\beta_{ex})]^2 + [Rg \sin(\beta_{ex}) \sin(\gamma) + (Z+P) \cos(\gamma)]^2$$

Eq. 3

$$\theta = \pi - \beta + \tan^{-1} \left[ \frac{\frac{NG}{NM}(CL + Rg \cos\beta \sin\gamma) + Rg \cos\beta}{\frac{NG}{NM}(Rg \sin\beta \sin\gamma + (Z+P)\cos\gamma) + Rg \sin\beta} \right]$$

Eq. 4

$$X = Rg \sin\theta$$

Eq. 5

$$\phi = \phi_{Ref3} - \theta$$

Eq. 6

$$\phi = \phi_{Ref4} - \theta + Z/H$$

Eq. 7

$$\phi_{Ref4} = \phi_{Ref3} + 2\sin^{-1}(w/2Rg).$$

* * * * *